United States Patent
Ho

(10) Patent No.: US 6,190,526 B1
(45) Date of Patent: Feb. 20, 2001

(54) IN-SITU REMEDIATION OF CONTAMINATED SOILS

(75) Inventor: Sa Van Ho, St. Louis, MO (US)

(73) Assignee: Monsanto Company, St. Louis, MO (US)

(*) Notice: Under 35 U.S.C. 154(b), the term of this patent shall be extended for 0 days.

(21) Appl. No.: 09/319,873

(22) PCT Filed: Dec. 5, 1997

(86) PCT No.: PCT/US97/23038
§ 371 Date: Aug. 26, 1999
§ 102(e) Date: Aug. 26, 1999

(87) PCT Pub. No.: WO98/26881
PCT Pub. Date: Jun. 25, 1998

Related U.S. Application Data

(60) Provisional application No. 60/032,977, filed on Dec. 16, 1996.

(51) Int. Cl.[7] .................................................. B01D 61/42
(52) U.S. Cl. ............................................. 204/515; 205/766
(58) Field of Search ........................... 204/515; 205/766; 588/204

(56) References Cited

U.S. PATENT DOCUMENTS

| | | | |
|---|---|---|---|
| 2,831,804 | * 4/1958 | Collopy | 204/515 |
| 4,067,389 | 1/1978 | Savins | 166/246 |
| 4,378,845 | 4/1983 | Medlin et al. | 166/297 |
| 4,458,747 | 7/1984 | Berry et al. | 165/104.29 |
| 4,964,466 | 10/1990 | Williams et al. | 166/300 |
| 5,398,756 | 3/1995 | Brodsky et al. | 166/248 |
| 5,458,747 | 10/1995 | Marks et al. | 204/130 |

OTHER PUBLICATIONS

Fletcher, S; Donnelly, Paula K.; Hegde, Ramesh S. "Biostimulation of PCB–Degrading Bacteria by Compounds Released from Plant Roots" *Bioremediation of Recalicatrant Organics*. 1995, pp. 131–136.

Cunningham, Scott D. Berti, William R.; Huang, Jianwei W. "Remediation of Contaminated Soils and Sludges by Green Plants" *Bioremediation of Inroganics*. 1995, pp. 33–53.

Bruell, C.J. et al., "Electroosmotic Removal of Gasoline Hydrocarbons and TCE from Clay", *J. Environ. Eng.*, vol. 118, No. 1, pp. 68–83, Jan./Feb. 1992.

Segall, B.A. et al., "Electroosmotic Contaminant–Removal Processes", *J. Environ. Eng.*, vol. 118, No. 1, pp. 84–100, Jan./Feb. 1992.

Shapiro, A.P., et al., Removal of Contaminants From Saturated Clay by Electroosmosis: *Environ. Sci. Techno.* Vo. 27, No.2, pp. 283–91, 1993.

Donnelly, P.K. et al., "Growth of PCB–Degrading Bacteria on Compounds From Photosynthetic Plants" *Chemosphere*, 28:981, (no date).

Acar, Y.B. et al., "Phenol Removal from Kaolinite by Electrokinetics", *J. Geotech. Eng.*, vol. 118, No.11, pp 1837–52, Nov. 1992.

* cited by examiner

*Primary Examiner*—Arun S. Phasge
(74) *Attorney, Agent, or Firm*—Thompson Coburn LLP; Gordon F. Sieckmann; Paul A. Lesko

(57) ABSTRACT

A process for the in situ remediation of soil comprising introducing at least one co-metabolite for treating contaminants in a contaminated soil region into the contaminated soil region wherein the source of the at least one co-metabolite is at least one root zone located within the contaminated soil region, wherein each root zone contains the root system of a plurality of plants capable of releasing the at least one co-metabolite, and transmitting direct electric current through the contaminated soil region between a first electrode and a second electrode having opposite charge, wherein the first electrode is located at a first end of the contaminated soil region and the second electrode is located at the opposite end of the contaminated soil region.

24 Claims, No Drawings

IN-SITU REMEDIATION OF CONTAMINATED SOILS

CROSS-REFERENCE TO RELATED APPLICATIONS

This application is a 371 of PCT/US97/23038 filed Dec. 5, 1997, which claims the benefit of U.S. Provisional Application No. 60/032,977, filed Dec. 16, 1996.

STATEMENT REGARDING FEDERALLY SPONSORED RESEARCH OR DEVELOPMENT (NOT APPLICABLE)

BACKGROUND OF THE INVENTION

This invention relates to in-situ remediation of contaminated soils. In one aspect, this invention relates to a novel process combining electrokinetics and treatment of contaminants using phytoremediation. In a further aspect, this invention relates to a novel process for the in-situ remediation of soils contaminated with toxic organic compounds and/or ionic contaminants.

Generally, degradation of toxic organic compounds to innocuous products such as $CO_2$ and water can be accomplished either biologically or physicochemically provided the treatment is carried out in a well-controlled environment in which key operating parameters such as temperature, pressure, mixing, addition of the reactants or nutrients, etc. are optimized. Examples of these technologies include incineration and its variations, supercritical water oxidation, $UV/H_2O_2$/ozonelcatalytic oxidation, reductive dehalogenation and biodegradation in an optimized bioreactor. However, the costs associated with these technologies are high for the decontamination of soil, which must first be excavated and then processed into a form suitable for the particular reactor used. The reactor constitutes a major portion of the overall cost in these processes due to either the extreme conditions required with thermal approaches or the very long holding times required in biological approaches. To overcome these problems, destruction of the contaminants needs to be done in-situ to avoid the cost and complications associated with excavation and handling, and the process has to be energy efficient and mild to minimize capital and operating costs.

Various techniques have been suggested for application in processes for the in-situ remediation of soils contaminated with toxic organic compounds. Examples of such techniques include hydraulic fracturing, also referred to as hydrofracturing, and electroosmosis. However, these techniques as currently practiced suffer from limitations which make them commercially impractical.

Hydraulic fracturing is an established oil field technology for increasing the production rates of oil or gas wells which has recently been adapted by the Environmental Protection Agency (EPA) Risk Reduction Engineering Laboratory as a method to access subsurface soils for remediation purposes. See EPA Groundwater Currents, Office of Solid Waste and Emergency Response Technology Innovation Office, September 1992. While this technique is of little utility as a remediation technique by itself, it has potential for enhancing other remedial technologies such as vapor extraction, steam stripping, soil washing, and especially bioremediation. A major problem with the use of hydraulic fracturing, however, involves its use with contaminated fine-grained soils such as clayey or silty soils. These soils have such low permeabilities that it is not possible for liquids to be pumped through uniformly by hydraulic means. Therefore, contaminants in these soils remain poorly accessible.

Electrokinetics, specifically electroosmosis, is another technique which has been suggested for use in in-situ remediation of soils contaminated with non-ionic, soluble organic compounds. Electroosmosis involves applying an electrical potential between two electrodes immersed in soil to cause water in the soil matrix to move from the anode to the cathode when soils are negatively charged, such as is the case with clayey soils. When the soil is positively charged, however, the direction of flow would be from the cathode to the anode. The technique has been used since the 1930's for removing water from clays, silts and fine sands. The major advantage for electroosmosis as an in-situ remediation method for difficult media, e.g. clay and silty sand, is its inherent ability to get water to flow uniformly through clay and silty sand at 100 to 1000 times faster than attainable by hydraulic means, and with very low energy usage. Electroosmosis has two major limitations as currently practiced that makes it impractical for actual field remediation. First, the liquid flow induced by electroosmosis is extremely slow, i.e. about one inch per day for clayey soils, which could result in a cumbersome and very long-term operation in large-scale operations. Second, several laboratory studies (see Bruell, C. J. et al., "Electroosmotic Removal of Gasoline Hydrocarbons and TCE from Clay", J. Environ. Eng., Vol. 118, No. 1, pp. 68–83, January/February 1992 and Segall, B.A. et al., "Electroosmotic Contaminant-Removal Processes", J. Environ. Eng., Vol. 118, No. 1, pp. 84–100, January/February 1992) have indicated that part of the soil bed became dry after approximately one month under the electroosmotic effect, resulting in reduced flow and the eventual stoppage of the process. Another laboratory study (see Shapiro, A. P. et al., "Removal of Contaminants From Saturated Clay by Electroosmosis", Environ. Sci. Technol., Vol. 27, No. 2, pp. 283–91, 1993) has indicated that the acid generated at the anode moves through the soil bed in the direction of the cathode and results in reduced electroosmotic flow and eventual stoppage of the process.

Electrokinetics, specifically electromigration, involves applying an electrical potential between two electrodes immersed in soil to cause solute, e.g. ions of metals, to migrate through a solution along the imposed voltage gradient, i.e. electromigratory movement. The charged species of metals in the soil migrate toward the oppositely charged electrodes and are collected at the electrodes. Electromigration has several limitations as currently practiced that make it difficult for actual field remediation. First, pH of the solution near the cathode tends to be very alkaline due to water electrolysis at the electrode and this causes most metals to precipitate in the soil making it difficult to remove the contaminants as well as blocking the flow of water through the contaminated soil region. Second, electrokinetics is inherently not a very stable process due to build-up of concentration, pH and osmotic gradients in the soil between the electrodes which adversely affect the process. In addition, the soil itself will also be altered over time, e.g. the soil will suffer from drying and cracking.

A process for the in-situ remediation of contaminated soil which combines electrokinetics with treating zones containing material for treating contaminants is disclosed in U.S. Pat. No. 5,398,756, which patent is incorporated by reference herein. U.S. Pat. No. 5,398,756 solves the above-described problems with electrokinetics.

Phytoremediation, i.e. remediation using plants, has been shown to be locally effective for uptake of metals from soil and water. Less is known for organic contaminants, especially those recalcitrant organic compounds that have very low water solubility and strong binding to the soil (high log $K_{ow}$), i.e. polychlorinated biphenyls (PCBs), polyaromatic hydrocarbons (PAHs) and dioxins. A major contributing factor to the persistence of recalcitrant contaminants is that only a few species of microorganisms appear capable of degrading those compounds. The challenge in bioremediation of such compounds is to promote the growth and activity of the small minority component of the indigenous microbial community that effectively biodegrade these compounds. One approach is to provide co-metabolites from plant roots to promote the growth and activity of the effective indigenous microorganisms. However, phytoremediation suffers from problems like the seasonal nature of the production of the co-metabolites, and the localized effect of the co-metabolites, i.e. only those contaminants in the immediate vicinity of the roots are effected.

An in-situ remediation process for single or mixed waste contamination remediation which is commercially practical and economical, and solves the above-described problems with phytoremediation would be highly desirable. A process has now been discovered which combines electrokinetics and phytoremediation to degrade contaminants, particularly recalcitrant organic compounds, solves the above-described problems with phytoremediation.

BRIEF SUMMARY OF THE INVENTION

It is an object of the invention to provide a process for the in-situ remediation of contaminated soil. It is a further object of the invention to provide a commercially practical and economical process for the in-situ remediation of contaminated soil. It is yet a further object of the invention to provide a process for the in-situ remediation of contaminated soil which is particularly well suited for use with clayey or silty soils. It is a still further object of the invention to provide a process for the in-situ remediation of contaminated soil, particularly soil containing recalcitrant organic compounds, which does not suffer from the current problems associated with the use of phytoremediation.

According to the invention, a process for the in-situ remediation of soil is provided which comprises introducing at least one co-metabolite for treating contaminants in a contaminated soil region into the contaminated soil region wherein the source of the at least one co-metabolite is at least one root zone located within the contaminated soil region, wherein each root zone contains the root system of a plurality of plants capable of releasing the at least one co-metabolite, and transmitting direct electric current through the contaminated soil region between a first electrode and a second electrode having opposite charge, wherein the first electrode is located at a first end of the contaminated soil region and the second electrode is located at the opposite end of the contaminated soil region (1) to cause an electroosmotic flow from the second electrode to the first electrode, (2) to cause an electromigratory movement of ionic contaminants in a direction toward the electrode of opposite charge, or (3) to cause an electroosmotic flow from the second electrode to the first electrode and an electromigratory movement of ionic contaminants in a direction toward the electrode of opposite charge.

In one embodiment, the electrical polarity is periodically reversed to reverse the direction of movement of contaminants through the contaminated soil region and/or root zones. In another embodiment, water from the electroosmotic flow is recycled in the direction from the first electrode to the second electrode. In still another embodiment, the electrical polarity is periodically reversed to reverse the direction of movement of contaminants through the contaminated soil region and/or root zones and water from the electroosmotic flow is recycled in the direction from the first electrode to the second electrode. In yet another embodiment, a first liquid which comprises water is supplied to the contaminated soil region wherein the direct electric current causes the first liquid to flow by electroosmosis in a direction from the second electrode to the first electrode. In the embodiment where the first liquid is supplied to the contaminated soil region, the electrical polarity can be reversed or the electroosmotic flow can be recycled or both.

Further according to the invention, a process for the in-situ remediation of soil is provided which comprises transmitting direct electric current through the contaminated soil region between a first electrode and a second electrode having opposite charge, wherein the first electrode is located at a first end of the contaminated soil region and the second electrode is located at the opposite end of the contaminated soil region (1) to cause an electroosmotic flow from the second electrode to the first electrode, (2) to cause an electromigratory movement of ionic contaminants in a direction toward the electrode of opposite charge, or (3) to cause an electroosmotic flow from the second electrode to the first electrode and an electromigratory movement of ionic contaminants in a direction toward the electrode of opposite charge, wherein the contaminated soil region contains at least one root zone containing microorganisms and co-metabolites, wherein each root zone contains the root system of a plurality of plants which release co-metabolites for treating contaminants in said contaminated soil region; and periodically reversing the polarity of the first and second electrodes to reverse the direction of movement of the contaminants through the contaminated soil region. In one embodiment, the electroosmotic flow is recycled in the direction opposite the electroosmotic flow.

BRIEF DESCRIPTION OF THE SEVERAL VIEWS OF THE DRAWING (NOT APPLICABLE)

DETAILED DESCRIPTION OF THE INVENTION

A first embodiment of the invention relates to a process for the in-situ remediation of soil comprising: (a) introducing at least one co-metabolite for treating contaminants in a contaminated soil region into the contaminated soil region wherein the source of the at least one co-metabolite is at least one root zone located within the contaminated soil region, wherein each root zone contains the root system of a plurality of plants capable of releasing the at least one co-metabolite, and (b) transmitting direct electric current through the contaminated soil region between a first electrode and a second electrode having opposite charge, wherein the first electrode is located at a first end of the contaminated soil region and the second electrode is located at the opposite end of the contaminated soil region (1) to cause an electroosmotic flow from the second electrode to the first electrode, (2) to cause an electromigratory movement of ionic contaminants in a direction toward the electrode of opposite charge, or (3) to cause an electroosmotic flow from the second electrode to the first electrode and an electromigratory movement of ionic contaminants in a direction toward the electrode of opposite charge.

A second embodiment of the invention relates to a process for the in-situ remediation of soil comprising: (a) transmitting direct electric current through the contaminated soil region between a first electrode and a second electrode having opposite charge, wherein the first electrode is located at a first end of the contaminated soil region and the second electrode is located at the opposite end of the contaminated soil region (1) to cause an electroosmotic flow from the second electrode to the first electrode, (2) to cause an electromigratory movement of ionic contaminants in a direction toward the electrode of opposite charge, or (3) to cause an electroosmotic flow from the second electrode to the first electrode and an electromigratory movement of ionic contaminants in a direction toward the electrode of opposite charge, wherein the contaminated soil region contains at least one root zone containing microorganisms and co-metabolites, wherein each root zone contains the root system of a plurality of plants which release co-metabolites for treating contaminants in the contaminated soil region; and (b) periodically reversing the polarity of the first and second electrodes to reverse the direction of movement of the contaminants through the contaminated soil region.

As used herein, the term "contaminated soil region" means a soil region containing organic compounds and/or ionic contaminants, such as metals and/or radionuclides, that has such low permeability that it is not possible for liquid to be pumped through uniformly by hydraulic means. Examples of such low perneability soils include, but are not limited to, clayey and silty soils. The contaminated soil region may, however, contain lenses or areas of high permeabilities, e.g. sand lenses.

As used herein, the term "electrokinetics" includes both electroosmosis and electromigration. The type of contaminants in the contaminated soil region and the physical and chemical characteristics of the contaminated soil region, e.g. pH, etc., will determine whether the transmission of direct electric current between the electrodes of opposite charge result in electroosmotic flow causing movement of non-ionic, soluble organic contaminants and/or movement of co-metabolites and/or microorganisms, electromigratory movement of ionic contaminants or both. The relative nature of electromigration compared to electroosmosis is such that the movement of ionic contaminants by electromigration is about 3–10 times faster than the flow caused by electroosmosis. In cases where both electroosmosis and electromigration occur, it is possible to utilize this difference to improve the efficiency of treating the organic and ionic contaminants by effecting the manner and rate at which they are treated.

In electroosmosis, the electroosmotic flow is utilized to move non-ionic, soluble organic contaminants into the root zones for biodegradation. In addition, the electroosmotic flow can be utilized to move co-metabolites from the root zone(s) into other areas of the contaminated soil region. The movement of co-metabolites is useful for treating, i.e. biodegrading, organic compounds that are not water soluble, and broadening the area within the contaminated soil region available for biodegradation. In electromigration, the electromigratory movement of ionic contaminants, i.e. metals or radionuclides, is utilized to move ionic contaminants into the root zones where they can be absorbed by the plant roots.

In the embodiments of the invention which utilize the recycle of water in the direction opposite the direction of electroosmotic flow, alone or in combination with the reversal of electrode polarity technique, the water may be recycled by any conventional method known to those skilled in the art. Examples of such methods include, but are not limited to, pumping, utilization of a connecting pipe or tube between the electrodes of opposite charge, and, in the case of vertical electrodes near the surface, flooding the surface between the electrodes. It is currently preferred to recycle the liquid by having a connecting pipe or tube between the electrodes of opposite polarity to enable the hydraulic differential between the electrodes of opposite charge to move the water in the direction opposite the electroosmotic flow particularly when used in combination with reversal of electrode polarity to eliminate the need for duplicate equipment.

The currently preferred embodiments of the invention utilize the reversal of electrical polarity of the electrodes to eliminate the problems associated with extended electrokinetic operation.

In another embodiment of the processes of the invention, the processes are operated intermittently. Intermittent operation, as used herein, means (a) that additional co-metabolite(s) is (are) released from root zone(s), or (b) that the direct electric current which provides the driving force for the electrokinetic process is alternated in an on/off operation to provide, for example, a residence time for contaminants to be degraded in the root zones, eg. by biodegradation, before additional contaminants are moved into the root zones.

Some plants produce compounds, i.e. co-metabolites, that promote the growth and activity of microorganisms, e.g. bacteria, fungi, etc., capable of degrading organic compounds. Of particular interest are recalcitrant organic compounds such as polychlorinated biphenyls (PCBs), polyaromatic hydrocarbons (PAHs), and dioxins. PAHs include the polynuclear aromatic compounds like naphthalene, anthracene, phenanthrene, and the substituted derivatives thereof In phytoremediation, the co-metabolites released/produced by the plant roots are only effective within a specific localized area around the root which is known as the rhizosphere. There is a restricted influence of the rhizosphere on the total soil volume in a contaminated soil region such that phytoremediation alone is commercially impractical due to the length of time that would be required to remediate a contaminated soil region.

Depending on the specific organic compound to be degraded, certain plants can be selected which produce the co-metabolite(s) in their root systems necessary to promote the growth of the specific microbial population capable of degrading the desired organic compound. The selection of plants will be apparent to one skilled in the art based on the specific organic compound to be degraded and the specific co-metabolite(s) needed to promote the microorganism(s) capable of degrading the organic compound. For example, when the organic compound is a PCB, a number of plant species are known to be potentially useful. See Fletcher, J. S. et al., "Biostimulation of PCB-degrading bacteria on compounds released from plant roots", *Bioremediation of Recalcitrant Organics*, Battelle Press, Columbus, Ohio, pp. 131–136 (1995). The preferred species for use in a process for degrading PCBs are apple, osage orange, and mulberry. See Fletcher, J. S. et al., "Release of phenols by perennial plant roots and their potential importance in bioremediation", *Chemosphere,* 31:3009 and Hegde, R. S. et al., "Influence of plant growth stage and season on the release of root phenolics by mulberry as related to development of phytoremediation technology", *Chemosphere,* 32:2471. In the case of mulberry, root turnover (annual growth and death) is associated with the release of co-metabolites such as coumarin that stimulate the growth of PCB-degrading microorganisms.

The microorganisms useful in the processes of the invention will depend on the specific organic contaminants in the contaminated soil region to be bioremediated. The microorganisms can be indigenous to the contaminated soil region/root zones or they can be added to the contaminated soil region. The biodegradation can be conducted under aerobic conditions, anaerobic conditions or a combination of aerobic and anaerobic conditions. Depending on the type and number of organic contaminants present in the contaminated soil region, a single type of microorganism or a mixture of different microorganisms may be required. The specific microorganisms required to treat each organic contaminant present, including recalcitrant organic compounds, are well known to those skilled in the art.

The co-metabolites useful in the processes of the invention will depend on the specific contaminants in the contaminated soil region to be treated and microorganisms used. Co-metabolites are compounds that microorganisms, e.g. methanotrophic bacteria, can utilize for a carbon and energy source and in the process also degrade another contaminant present in the contaminated soil region which cannot be effectively degraded by the microorganism alone. Co-metabolites are particularly useful in degrading chlorinated organic compounds. Suitable co-metabolites produced by plants include the class of phenolic compounds, including coumarins, flavonoids, and the like. Examples of suitable co-metabolites include, but are not limited to, phenol, coumarins, catechins, cinnamic acids, hydroxybenzophenones, the substituted derivatives thereof, and mixtures thereof Specific examples of plant produced co-metabolites include coumarin, scopoletin, apigenin, catechin, naringenin, phloridzin, 4-hydroxycinnamic acid and 2, 3',4, 4', 6-pentahydroxy benzophenone (maclurin). In the case of PCBs, the preferred co-metabolites are apigenin, catechin, coumarin, naringenin, maclurin, and phloridzin. See Donnelly, P. K. et al., "Growth of PCB-degrading bacteria on compounds from photosynthetic plants", *Chemosphere*, 28:981.

The type of co-metabolite required is well known to those skilled in the art depending on the specific contaminants present and the specific microorganism used.

Electrokinetics, e.g. electroosmosis and electromigration, can be accomplished by any conventional method known to those skilled in the art, such as those disclosed in Bruell, C. J. et al., "Electroosmotic Removal of Gasoline Hydrocarbons and TCE from Clay", *J. Environ. Eng.*, Vol. 118, No. 1, pp. 68–83, January/February 1992, Segall, B. A. et al., "Electroosmotic Contaminant-Removal Processes", *J. Environ. Eng.*, Vol. 118, No. 1, pp. 84–100, January/February 1992 and Acar, Y. B. et al., "Phenol Removal from Kaolinite by Electrokinetics", *J. Geotech. Eng.*, Vol. 118, No. 11, pp. 1837–52, November 1992.

Electroosmosis, i.e. the movement of water in the soil matrix from an anode to a cathode, and electromigration, i.e. the movement of ionic contaminants in the soil matrix in the direction toward the electrode of opposite charge, occurs when a constant, low DC electrical current is applied to electrodes located in the contaminated soil region. A first electrode will be typically located at a first end of the contaminated soil region and a second electrode will be typically located at the opposite end of the contaminated soil region to cause an electroosmotic flow from one electrode to the other. As used herein, the terms "first electrode" and "second electrode" can be a single electrode or a plurality of electrodes located across the contaminated soil region at approximately the same horizontal, vertical or diagonal level in the contaminated soil region depending on whether the treating zones are vertical, horizontal or diagonal with respect to the soil surface. Electrical connections and electrode sizes and materials will vary depending on each particular situation. Selection of electrodes will be apparent to one skilled in the art. When the contaminants in the contaminated soil region are organic compounds, it is currently preferred that the electrodes contain carbon or graphite particles because the carbon or graphite aids in pH buffering of the overall electrokinetic process. It is also currently preferred that the electrodes be open electrodes that permit the ingress or egress of a liquid; an open electrode may also be one which is not itself porous or perforated, but which is located within a perforated container or directly behind a liquid permeable region or zone. In addition, the electrode can also function as a treating zone, e.g. an adsorption zone, wherein the carbon or graphite particles also serve as an adsorbent.

When the electrodes are horizontal, a first electrode will be located at or near ground level and a second electrode will be located below the first electrode, preferably at the bottom or below the contaminated soil region. When the first electrode is located at ground level, it could simply be a metal screen lying on the ground surface. The second electrode, for example, can be a fracture, formed by hydrofracturing, pneumatic fracturing, etc., containing electronically conducting materials such as graphite particles or a mixture of graphite particles and sand formed by injecting a fracturing fluid containing sand and graphite through a second wellbore at a sufficient rate and at a sufficient pressure to form the fracture.

When the electrodes are vertical, a first electrode will typically be located at one end of the contaminated soil region and a second electrode will typically be located at the opposite end of the contaminated soil region. Suitable vertical electrodes can, for example, be an electronically conductive rod, pipe or an electronically conductive granular medium, e.g. graphite or a mixture of graphite and sand, in a hole formed in the soil, such as with trench formation or sheet piling.

Hydraulic fracturing is a method to access subsurface soil for remediation purposes. The fracturing of subterranean formations is accomplished by injecting or pumping a fracturing fluid through a wellbore at a sufficient rate and pressure to cause a fracture to form in the formation, i.e. the contaminated soil region. The fracturing fluid is typically viscosified with a gel, e.g. a water-soluble natural or synthetic polymer. Examples of water-soluble polymers include, but are not limited to, guar, hydroxypropyl guar, carboxy-methylhydroxypropyl guar, methylcellulose and hydroxyethylcellulose.

Hydraulic fracturing can be accomplished by any conventional method known to those skilled in the art, such as those disclosed in U.S. Pat No. 4,964,466, U.S. Pat. No. 4,378,845, and U.S. Pat. No. 4,067,389. For example, after notching the bottom of a well with a water jet, a guar gum matrix with a granular material, preferably sand, suspended in it is added under sufficient pressure until a pancake-shaped fracture is created. An enzyme is added to break down the guar gum matrix, which can then be pumped back out, leaving a sand lens. These fractures can be stacked as close as 20 cm (8 inches). The granular material is generally referred to as a proppant and is necessary to keep the fracture from closing after the water-soluble polymer is broken down and removed.

Pneumatic fracturing is a method to access subsurface soil for remediation purposes. The fracturing of subterranean formations is accomplished by injecting a compressed gas, e.g. air, source through a wellbore at a sufficient rate and pressure to cause a fracture to form in the formation, i.e. the contaminated soil region. The process consists of introducing the high-pressure gas down the borehole through an injector. The pressured media creates air flow channels emanating from the injection point and forms fractures having a radius of influence up to forty feet from the wellbore.

Impulse fracturing is another method to access subsurface soil for remediation purposes. The fracturing of subterranean formations is accomplished with pulses of water generated by a Hydraulic Impulse Device (HID). The HID is a high-pressure hydraulic intensifier that discharges a 0.5 liter slug of fluid in a few tenths of a second. The fluid is discharged through a nozzle that can be inserted into a borehole and fires into the surrounding formation. Injection pressure increases sharply to 8500 psi (58 MPa) in 12 milliseconds and then decreases to atmospheric during the following 275 milliseconds. Velocity of the fluids at the leading edge of the impulse are on the order of 150 to 450 m/sec. Sand is introduced into the fluid phase and carried into the fracture created by the impulse. The general deformation created by a single impulse includes a cylindrical hole and fractures either parallel or normal to the axis of the hole. Additional impulses enlarge the fractures.

Impulse fracturing can be performed in both overconsolidated and normally consolidated soils, whereas hydraulic fracturing is better suited for overconsolidated soils (fractures created in normally consolidated soils usually propagate vertically and intersect the ground surface). In addition, impulse fractures can be created near underground utilities and in the vicinity of structures that may be detrimentally affected by the surface deformation associated with hydraulic fractures.

Sheet piling is a method that involves driving lengths of connectable sheet piling material, e.g. steel, into the ground. The lengths of sheet piling material can be connected by any conventional means, such as with slotted connections, ball and socket type connections or interlocking joints. If the sheet piling material is to remain in the soil during treatment, the preferred connection means is the interlocking joint that incorporates a cavity that is filled with a sealant after driving to prevent leakage through the joints. The sheet pilings can be driven to depths of 100 ft (30 m) or more in unconsolidated deposits lacking boulders.

The sheet piling material is driven into the ground by use of a pile hammer. The types of pile hammers include drop, single-acting steam, double-acting steam, diesel, vibratory and hydraulic. For each type of hammer listed the driving energy is supplied by a falling mass which strikes the top of the pile. The piles are driven to their desired depth, i.e. to a point below the contaminated soil region, and the remaining above ground portion can optionally be cut off Trench formation is a method that involves excavating soil to a sufficient depth at least as deep as the depth of the contaminated soil region. The trench also will typically be excavated so that it extends laterally as far as is necessary to ensure that all of the contaminated soil region is covered. If multiple trenches are used, they may each extend laterally to cover the entire contaminated soil region or they may overlap as long as the entire width of the contaminated soil region is provided with sufficient treating zones to treat the contaminants. The excavated trench is then filled with a filling material containing the electronically conducting material to function as an electrode in the contaminated soil region.

During electroosmosis the treating materials, e.g. microorganisms and/or co-metabolites, may move from the root zones into other areas of the contaminated soil region such that the degradation of the contaminants may occur throughout the contaminated soil region as well as in the root zones.

In the processes of the invention where water is not added to the contaminated soil region, the water used for the electroosmosis will be groundwater or rainwater, i.e. water supplied to the contaminated soil region can be from an above ground source or from an in ground source outside the contaminated soil region to be treated. If groundwater alone is not sufficient, surfactants can also be introduced into the contaminated soil region to desorb or solubilize the contaminants from the soil. External water is not necessary because the process of the invention utilizes periodic reversal of the electrical polarity on the electrodes to reverse the liquid flow by electroosmosis and the electromigratory movement of ionic contaminants, recycle of electroosmotic flow or utilization of in ground water located outside the contaminated soil region to be treated. It has been found that periodic reversal of flow minimizes the soil drying phenomenon associated with extended electroosmotic operation. This simple back-and-forth flow scheme also results in the liquid having multiple passes through the contaminated soil, each time removing additional contaminants from the soil and delivering them to the treating zones. It has also been found that recycle of electroosmotic flow, i.e. water, also minimizes the soil drying phenomenon associated with extended electroosmotic operation.

In the process of the invention where an external liquid comprising water is added to the contaminated soil region, the liquid can be added through an open electrode or at another location within the contaminated soil region. An open electrode is one which permits the flow of a liquid, e.g. water. An open electrode may be one which itself is perforated or porous, such as electronically conductive rods, pipes or granular media to permit the ingress or egress of a liquid; an open electrode may also be one which is not itself perforated, but which is located within a perforated container. The external liquid may also contain surfactants to desorb the contaminants from the soil. The reversal of flow technique or the recycle of electroosmotic flow technique described herein can also be utilized in the process of the invention where a liquid is supplied to the contaminated soil region.

The contaminated soil region will be periodically sampled, such as by taking a core sample, and the soil analyzed to determine if the level of contaminants has been reduced to an acceptable level. When the sample analysis indicates that the contaminant level has fallen to or below the acceptable level, the process of the invention can be stopped.

That which is claimed is:

1. A process for the in-situ remediation of soil comprising:
   (a) introducing at least one co-metabolite for treating contaminants in a contaminated soil region into said contaminated soil region wherein the source of said at least one co-metabolite is at least one root zone located within said contaminated soil region, wherein each said root zone contains the root system of a plurality of plants capable of releasing said at least one co-metabolite, and
   (b) transmitting direct electric current through said contaminated soil region between a first electrode and a second electrode having opposite charge, wherein said first electrode is located at a first end of said contaminated soil region and said second electrode is located at the opposite end of said contaminated soil region (1) to cause an electroosmotic flow from said second electrode to said first electrode, (2) to cause an electromigratory movement of ionic contaminants in a direction toward the electrode of opposite charge, or (3) to cause an electroosmotic flow from said second electrode to said first electrode and an electromigratory movement of ionic contaminants in a direction toward the electrode of opposite charge.

2. The process of claim 1 wherein said direct electric current of (b) causes an electroosmotic flow from said second electrode to said first electrode.

3. The process of claim 1 further comprising:
   (c) periodically reversing the polarity of said first and second electrodes to reverse the direction of movement of said contaminants through said contaminated soil region.

4. The process of claim 1 further comprising:
   (c) recycling water from said electroosmotic flow in the direction from said first electrode to said second electrode.

5. The process of claim 1 further comprising:
   (c) periodically reversing the polarity of said first and second electrodes to reverse the direction of movement of said contaminants through said contaminated soil region and recycling water from said electroosmotic flow in the direction from said first electrode to said second electrode.

6. The process of claim 1 further comprising:
   (c) supplying a first liquid which comprises water to said contaminated soil region, wherein said direct electric current causes said first liquid to flow by electroosmosis in a direction from said second electrode to said first electrode.

7. The process of claim 1 further comprising:
   (d) (1) periodically reversing the polarity of said first and second electrodes to reverse the direction of movement of said contaminants through said contaminated soil region, (2) recycling the water from said electroosmotic flow from said first electrode to said second electrode, or (3) periodically reversing the polarity of said first and second electrodes to reverse the direction of movement of said contaminants through said contaminated soil region and recycling the water from said electroosmotic flow in the direction opposite said electroosmotic flow.

8. The process of claim 1 wherein said contaminant is a recalcitrant organic compound.

9. The process of claim 8 wherein said recalcitrant organic compound is biodegraded by a microorganism which utilizes said co-metabolite.

10. The process of claim 9 wherein said microorganism is indigenous to said contaminated soil region.

11. The process of claim 8 wherein said recalcitrant organic compound is selected from the group consisting of polychlorinated biphenyl compounds, polyaromatic hydrocarbons and dioxin compounds.

12. The process of claim 1 wherein said first electrode is located at the surface of the contaminated soil region and said second electrode is located at a depth below said contaminated soil region.

13. The process of claim 12 wherein said second electrode comprises a fracture containing graphite or a mixture of graphite and proppant wherein the fracture is formed by injecting a fracturing fluid containing a mixture of graphite and proppant or graphite through a second wellbore at a sufficient rate and at a sufficient pressure to form the fracture.

14. The process of claim 1 wherein said soil is clayey or silty.

15. The process of claim 1 wherein said process is operated intermittently.

16. The process of claim 15 wherein said direct electric current is transmitted intermittently.

17. A process for the in-situ remediation of soil comprising:
   (a) transmitting direct electric current through said contaminated soil region between a first electrode and a second electrode having opposite charge, wherein said first electrode is located at a first end of said contaminated soil region and said second electrode is located at the opposite end of said contaminated soil region (1) to cause an electroosmotic flow from said second electrode to said first electrode, (2) to cause an electromigratory movement of ionic contaminants in a direction toward the electrode of opposite charge, or (3) to cause an electroosmotic flow from said second electrode to said first electrode and an electromigratory movement of ionic contaminants in a direction toward the electrode of opposite charge, wherein said contaminated soil region contains at least one root zone containing microorganisms and co-metabolites, wherein each said root zone contains the root system of a plurality of plants which release co-metabolites for treating contaminants in said contaminated soil region; and
   (b) periodically reversing the polarity of said first and second electrodes to reverse the direction of movement of said contaminants through said contaminated soil region.

18. The process of claim 17 further comprising:
   (d) recycling water from said electroosmotic flow in the direction from said first electrode to said second electrode.

19. The process of claim 17 wherein said contaminant is a recalcitrant organic compound.

20. The process of claim 19 wherein said recalcitrant organic compound is biodegraded by a microorganism which utilizes said co-metabolite.

21. The process of claim 20 wherein said microorganism is indigenous to said contaminated soil region.

22. The process of claim 19 wherein said recalcitrant organic compound is selected from the group consisting of polychlorinated biphenyl compounds, polyaromatic hydrocarbons and dioxin compounds.

23. The process of claim 17 wherein said process is operated intermittently.

24. The process of claim 23 wherein said direct electric current is transmitted intermittently.

* * * * *

UNITED STATES PATENT AND TRADEMARK OFFICE
CERTIFICATE OF CORRECTION

PATENT NO. : 6,190,526 B1  
DATED : February 20, 2001  
INVENTOR(S) : San Van Ho It is certified that error appears in the above-identified patent and that said Letters Patent is hereby corrected as shown below:

Column 1,
Line 32, please replace the term "ozonelcatalytic" with the term
-- ozone/catalytic. --

Column 5,
Line 26, please replace the term "perneability" with -- permeability --.

Signed and Sealed this

Thirtieth Day of October, 2001

Attest:

NICHOLAS P. GODICI
Attesting Officer  Acting Director of the United States Patent and Trademark Office